United States Patent [19]

Jacobsen et al.

[11] Patent Number: 5,311,666

[45] Date of Patent: May 17, 1994

[54] ROTARY DISPLACEMENT MEASURING APPARATUS

[75] Inventors: Stephen C. Jacobsen; Michael G. Mladejovsky; Clark C. Davis; Roland F. Wyatt, all of Salt Lake City, Utah

[73] Assignee: University of Utah Research Foundation, Salt Lake City, Utah

[21] Appl. No.: 63,152

[22] Filed: May 18, 1993

Related U.S. Application Data

[63] Continuation of Ser. No. 719,285, Jun. 21, 1991, abandoned.

[51] Int. Cl.$^5$ .............................................. G01B 7/30
[52] U.S. Cl. .................................... 33/1 PT; 33/1 N; 33/706; 364/559
[58] Field of Search ...................... 33/1 PT, 1 N, 706; 364/559

[56] References Cited

U.S. PATENT DOCUMENTS

| | | | |
|---|---|---|---|
| 3,068,457 | 12/1962 | Nevius | 361/298 |
| 3,218,635 | 11/1965 | Masur | 340/870.37 |
| 4,851,835 | 7/1989 | Krumholtz et al. | 340/870.37 |
| 4,879,552 | 11/1989 | Arai et al. | 340/870.37 |
| 4,910,488 | 3/1990 | Davis et al. | |
| 4,922,620 | 5/1990 | Terragni | 33/1 N |
| 4,964,306 | 10/1990 | Jacobsen et al. | |

FOREIGN PATENT DOCUMENTS

| | | | |
|---|---|---|---|
| 0184286 | 6/1986 | European Pat. Off. | 33/1 N |
| 1296724 | 5/1962 | France | 33/1 PT |
| 0076901 | 4/1986 | Japan | 33/1 N |
| 2052899 | 1/1981 | United Kingdom | 364/559 |
| 2118720 | 11/1983 | United Kingdom | 340/870.37 |
| 8400261 | 1/1984 | World Int. Prop. O. | 33/1 PT |

OTHER PUBLICATIONS

Rammelsberg, "Industrial Shaft Encoders", May 1978, Messon & Prüfen/automatik, p. 286, 289
Kilen, IBM Technical Disclosure Bulletin vol. 26 No. 7A, Dec. 1983, "Capacitive Encoder with Carrier Suppression".

Primary Examiner—William A. Cuchlinski, Jr.
Assistant Examiner—Alvin Wirthlin
Attorney, Agent, or Firm—Thorpe North & Western

[57] ABSTRACT

A rotary displacement measuring apparatus includes an axle whose rotary displacement is to be determined, with the axle being mounted to rotate about its long axis. An emitter is mounted on the axle to define a plurality of concentric tracks circumscribing the axle to rotate as the axle rotates, with each of the tracks being segmented to define a plurality of spaced-apart, conductive sections for producing electric fields when energized. Also included is a voltage source for energizing the conductive sections. A detector is disposed adjacent to the tracks of the emitter and includes a plurality of sensors, each positioned adjacent a respective track to detect the electric fields of the respective track as the axle and tracks are rotated. The detector produces signals representing the variation in the electric fields as the emitter is rotated, and these signals provide an indication of the rotary displacement of the tracks and thus of the axle.

33 Claims, 3 Drawing Sheets

| | D C B A |
|---|---|
| 0 | 0 0 0 0 |
| 1 | 0 0 0 1 |
| 2 | 0 0 1 1 |
| 3 | 0 0 1 0 |
| 4 | 0 1 1 0 |
| 5 | 0 1 1 1 |
| 6 | 0 1 0 1 |
| 7 | 0 1 0 0 |
| 8 | 1 1 0 0 |
| 9 | 1 1 0 1 |
| 10 | 1 1 1 1 |
| 11 | 1 1 1 0 |
| 12 | 1 0 1 0 |
| 13 | 1 0 1 1 |
| 14 | 1 0 0 1 |
| 15 | 1 0 0 0 |
| 0 | 0 0 0 0 |

Fig. 9

ROTARY DISPLACEMENT MEASURING APPARATUS

This application is a continuation of application Ser. No. 07/719,285, filed Jun. 21, 1991.

BACKGROUND OF THE INVENTION

This invention relates to a new, improved and precise rotary displacement measuring apparatus in which absolute measurement of rotary position may be made.

In the operation of various mechanical and electromechanical systems, it is necessary to monitor the position and displacement of either some element of the system or some object which is not part of the system. For example, in robotic systems it is almost always necessary to monitor and control the movement and position of various component parts of the systems, such as an arm, fingers or other grasping elements, etc. Such monitoring and control yields the dexterity and precision required for a robotic system to carry out its functions.

Two types of position and displacement measurement may be required in the above-described systems, these being linear displacement and position and angular or rotary displacement and position. Prior art mechanisms for sensing rotary position and displacement most often utilized a direct connection between the article or object whose position or displacement was to be monitored, and some type of gauge, needle or other visual indicator. Of course, such mechanisms were typically large, cumbersome, unreliable, and lacked precision in carrying out the monitoring function.

A number of electrical and electronic devices have been proposed for measuring angular position and displacement including so-called rotary variable differential transformers, such as described in U.S. Pat. No. 4,910,488. These devices provide for measuring angular displacement by converting mechanical rotation into an analog electrical signal. Electronic rotary position and displacement measuring apparatus has also been proposed as disclosed in co-pending U.S. application Ser. No. 07/478,266, filed Feb. 12, 1990. The above-mentioned electrical and electronic measuring devices, although reducing the bulkiness and imprecision problems of the prior art mechanisms, such devices still do not allow for the precision oftentimes desired in the mechanical and electromechanical systems in use or contemplated for use at the present time.

Other types of rotary displacement and position measuring transducers include resistance-based voltage dividers and optical encoders, both of which also suffer from one or more of the disadvantages mentioned above.

SUMMARY OF THE INVENTION

It is an object of the invention to provide a simple, reliable and precise apparatus for measuring angular or rotary position and displacement.

It is another object of the invention to provide such apparatus which is especially compact, contains few moving parts and requires few wires.

It is a further object of the invention to provide such apparatus which is simple to manufacture, lending itself to very large scale integration (VLSI) techniques.

The above and other objects of the invention are realized in a specific illustrative embodiment of rotary displacement measuring apparatus which includes a shaft whose rotary displacement is to be measured, mounted to rotate about its long axis, and an emitter coupled to the shaft to rotate as the shaft is rotated, for developing predetermined patterns of electric fields in which the patterns vary circumferentially on the emitter. Also included is a detector disposed in close proximity to the emitter adjacent the path traversed when the emitter is rotated, to detect variation in the electric field patterns as the emitter is rotated and to produce output signals representing variations in the electric field patterns. Such variation provides an indication of the position and displacement of the emitter and thus of the shaft.

In accordance with one aspect of the invention, the emitter comprises a generally planar disk mounted on the shaft to rotate in the plane defined by the disk and to direct the patterns of electric fields normally from an active side of the disk. The detector comprises a generally planar plate disposed in a fixed position to be generally parallel with the emitter disk on the active side thereof to enable detection of variations in the electric field patterns as the emitter disk is rotated.

In accordance with another aspect of the invention, the emitter disk may be biased into light rubbing contact with the detector plate, or held just apart from one another.

In accordance with still another aspect of the invention, a plurality of concentric tracks are formed on the active side of the emitter disk, each track including a plurality of spaced-apart conductive sections. A conductive layer of material is disposed on the detector plate on the side facing the active side of the emitter disk for developing an electric field to capacitively couple the layer and the track sections when a voltage signal is supplied to the layer. The conductive sections are thus caused to develop electric fields to be detected by the detector. A voltage supply source supplies a voltage signal to the conductive layer of material on the detector plate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
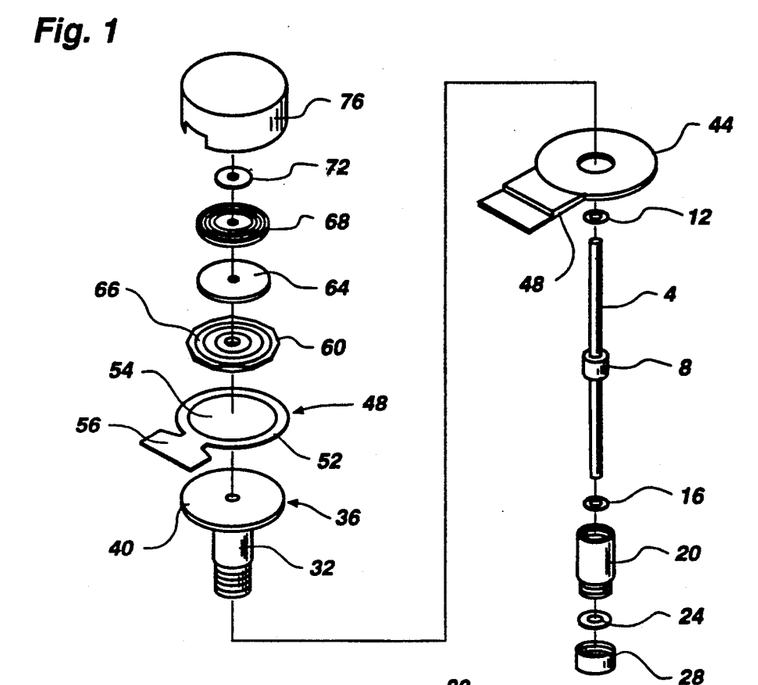
FIG. 1 is an exploded view of a rotary displacement measuring system made in accordance with the principles of the present invention.

Referring to FIG. 1, there is shown an exploded view of one specific illustrative embodiment of a rotary displacement and position transducer made in accordance with the present invention for measuring the angular displacement or rotation of a shaft 4 which would be coupled to the object or component whose angular displacement is to be measured. The other components of the transducer are mounted about the shaft as will be described.

A thrust shoulder 8 is formed at about the midpoint of the shaft 4 and thrust washers 12 and 16 are positioned on either side of the thrust shoulder. Disposed on the lower end of the shaft 4 is an axial clearance and adjust nut 20 for providing spacing, and including a threaded opening 22 into which may be screwed a correspondingly threaded cylinder 32 which is part of a transducer body 36. A plastic seal 24 and seal cap 28 are inserted over the lower end of the shaft 4, with the plastic seal abutting the lower end of the axial clearance and adjust nut 20 and the seal cap 28 screwing onto a lower threaded end of the nut. The shaft 4 projects through the plastic seal 24 and an opening in the seal cap 28 for coupling to an object or component whose angular displacement is to be measured.

Disposed on the upper end of the shaft 4 is the body 36 which includes a cylinder 32, as already indicated, for screwing into the axial clearance and adjust nut 20, and a support disk 40 disposed on top of the cylinder 32. Fitted over the cylinder 32 is a cable support disk 44 which includes a laterally extending support tab 48. The cable support disk 44 is urged upwardly about the cylinder 32 and against the underside of the support disk 40 of the body 36.

Disposed on and attached to the top of the support disk 40, at its perimeter, is a ring circuit board 48 with a laterally extending tab 56. The circuit board tab 56 rests on support tab 48 of the cable support disk and is used to connect to power supply and data input and output lines. A detector integrated circuit chip 60 is disposed within opening 54 of the ring circuit board 48 and attached to the support disk 40. The perimeter of the chip 60 is in electrical contact with the ring circuit board 48 as will be discussed in more detail later. The detector integrated circuit chip 60, ring circuit board 48, body 36 and cable support 44 are all held in fixed position relative to the surroundings while shaft 4, which extends through openings in the cable support 44, body 36 and detector integrated circuit chip 60, is free to rotate relative to these parts.

Disposed on the shaft 4 above the detector integrated circuit chip 60 is an emitter disk 64 on which will be developed patterns of electric fields which will be directed towards the chip 60. The emitter disk 64 is biased into light rubbing contact with the detector chip 60 by a suspension disk 68 which, along with the emitter disk 64, is slidably fitted over the shaft 4. Advantageously, a wear resistant film 66 is disposed over the detection chip 60 for contact with the emitter disk. A hub 72 is force fitted over the upper end of the shaft 4 to rotate as the shaft is rotated; the hub 72 is attached to the center of the suspension disk 68 whose perimeter is attached to the perimeter of the emitter disk 64. The suspension disk 68 is constructed to impart a bias force downwardly on the emitter disk 64 to urge it into light rubbing contact with the detector chip 60. As the shaft 4 is rotated, the hub 72, suspension disk 68, and emitter disk 64 are all caused to rotate so that the emitter disk 64 is caused to rotate relative to the detector chip 68 which detects and provides an output signal indicating the rotary displacement and position of the emitter disk.

A cover 76 is disposed to cover the hub 72, suspension disk 68, emitter disk 64, detector chip 60 and ring connector 48 by attaching to the cable support disk 44.

Provision of the two thrust washers 12 and 16, which are disposed in contact with the upper and lower surfaces respectively of the thrust shoulder 8 serve to eliminate substantial longitudinal movement of the transducer parts relative to the shaft 4 while also allowing free rotation thereof. The thrust washer 12 contacts ledges inside cylinder 32 (not shown) while thrust washer 16 similarly contacts ledges inside the axial clearance and adjust nut 20 (again not shown) so that as the nut 20 is tightened onto the threaded cylinder 32, the longitudinal movement or end play of the transducer parts relative to the shaft 4 are gradually reduced.

With the above-described transducer assembly of FIG. 1, all electrical connections to the transducer may be made via conductive tab 56 which receives mechanical support from support tab 48. The shaft 4 whose rotary displacement is to be measured is allowed to rotate freely and, because it fits through central openings in all of the component parts, it also serves to maintain the parts in proper alignment. The component parts are protected from contamination and damage by cover 76 and by the seal 24 and seal cap 28. As will be described momentarily, the emitter 64 and detector integrated circuit chip 60 electronics allow for significant miniaturization and this, in turn, yields high precision in making the rotary displacement measurements.

Figure 4:
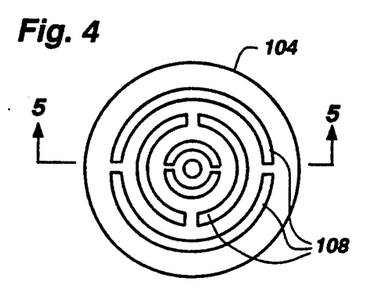
FIG. 4 is a top, plan view of a suspension disk of the system of FIG. 1.
Figure 5:
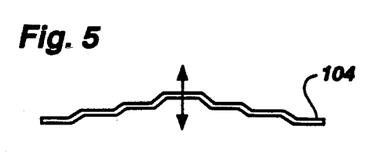
FIG. 5 is a side, cross-sectional view of the suspension disk of FIG. 4 taken along lines 5—5.

FIGS. 4 and 5 show top plan and side, cross-sectional, elevational views of one embodiment of the suspension disk 68 of FIG. 1. The disk consists of a sheet of resilient material, such as beryllium copper formed into a disk 104 and including a plurality of co-circumferential pairs of slots 108, formed concentrically in the disk. The adjacent ends of each pair of slots are offset, in the embodiment shown in FIG. 4, by 90 degrees from adjacent ends of the next radially adjacent pair of slots. This slot design allows for torsional or rotational stiffness of the disk 104 while providing axial resiliency and springiness as indicated in FIG. 5. The disk 104 is formed into a frusto-conical shape with the central portion of the disk being axially raised from the perimeter thereof. The resiliency and springiness of the disk may be maintained by initially forming the disk in the frusto-conical shape shown in FIG. 5. Thus, when a force is applied to the central portion of the disk 104, for example in the downward direction, a bias or force is produced by the perimeter of the disk also in the downward direction against any object in contact therewith.

Figure 6:
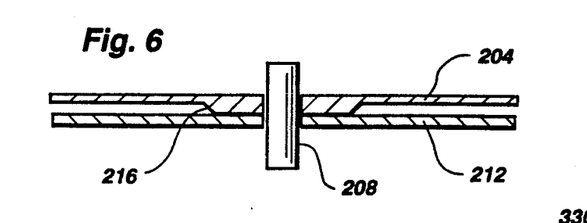
FIG. 6 is a side, cross-sectional view of one illustrative embodiment of an emitter and detector of the present invention.

The function of the suspension disk shown in FIGS. 1, 4 and 5 is to contact the perimeter of the emitter disk 64 (FIG. 1) and urge it into contact with the detector integrated circuit chip 60. FIG. 6 shows a side, cross-sectional view of one illustrative embodiment of an emitter disk 204 disposed about and longitudinally slidable with respect to a transducer shaft 208. A detector integrated circuit chip 212 is disposed about the shaft 208 and under the emitter disk 204 in an axially fixed position relative to the shaft 208 so that the emitter disk may be urged into contact therewith. In the embodiment of FIG. 6, the emitter disk 204 includes an annular rise or raised bearing surface 216 which contacts and slides over the central portion of the detector chip 212 as the emitter disk is rotated with rotation of the shaft 208. With the raised bearing surface 216, the remaining portions of the emitter disk 204 are maintained out of contact from the detector chip 212 but in close proximity therewith to enable precise detection of electric field patterns produced by the emitter disk. Illustratively, the emitter disk 204 could be made of sapphire formed by ion milling. The detector chip 212 could be a silicon wafer.

Another embodiment of the emitter disk and detector chip is simply to provide substantially flat facing surfaces for the disk and chip so that there is light contact between the entire facing surfaces. In this embodiment, the detector and/or emitter chip and disk would advantageously be coated with a wear-resistant layer of material such as silicon nitride on other dielectric film. In both embodiments of the emitter disk and detector chip construction, the emitter disk is maintained in close proximity to the detector chip and the spacing therebetween is maintained substantially uniform as the emitter disk is caused to rotate.

Figure 2:
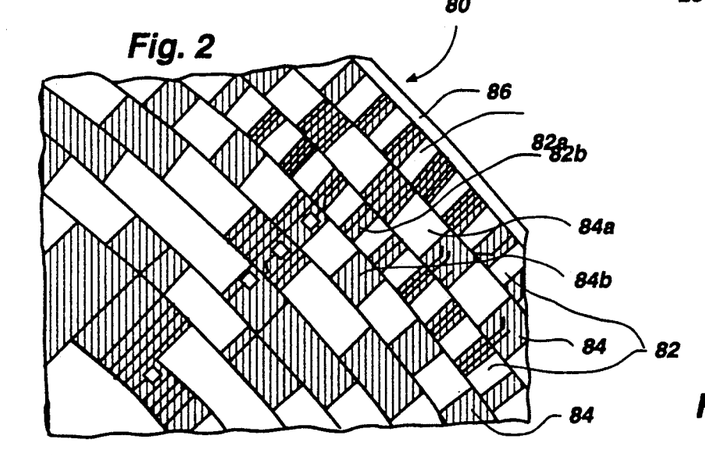
FIG. 2 is a top, plan, fragmented view of a representation of complementary, segmented tracks of the emitter of FIG. 1, also made in accordance with the principles of the present invention.
Figure 3:
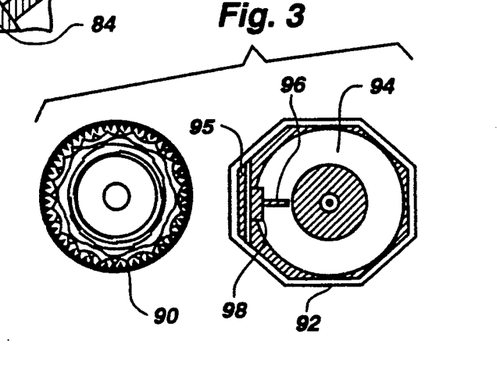
FIG. 3 are top, plan views of the emitter and detector of the system of FIG. 1.

FIGS. 2 and 3 show respectively a top plan, fragmented view of one illustrative embodiment of the emitter disk of FIG. 1, and top, plan views of an exemplary emitter disk and detector plate. As best seen in FIG. 2, an emitter disk 80 is formed with a plurality of pairs of complementary or conjugate tracks 82, 84, etc. formed concentrically on the disk surface. Each of the tracks is formed to include a plurality of spaced-apart conductive segments or sections made, for example, of a layer or film of aluminum. As will be discussed, the conductive sections may be energized to produce an electric field pattern which varies circumferentially on the disk. The conductive pattern is electrically continuous with no isolated regions to enable electrifying the pattern by capacitive coupling as will also be described later.

Advantageously, the conductive pattern of sections is formed to present a Gray code such that rotation of the emitter disk past a radial locus of points (at which electric field sensors will be located) results in incremental changes in value of the code. Of course, if the value changes incrementally as the disk is rotated, then this value may be detected to provide an indication of the rotational position of the disk.

As already indicated, the tracks are formed as complementary or conjugate pairs 82, 84, etc., with each track of a pair being spaced radially at least one track apart from the other track of the pair. Thus, one track of the pair 84 is disposed between the pair of tracks 82. The complementary or conjugate aspect of each pair of tracks is illustrated by reference to segments 82a and 82b of the pair of tracks 82. Segment 82a appears light in FIG. 2 indicating that it is metallized or is formed of a conductive layer of material whereas the dark segment 82b indicates that the disk is clear at that location (showing detector circuitry underneath), thus containing no metallization. Segments 82a and 82b occupy the same circumferential position on the emitter disk but, of course, different radial positions. Similarly, segments 84a and 84b (being larger than segments 82a and 82b) are conjugate in that section 84a is metallized and 84b is unmetallized. Of course, the metallized segments are capable of producing an electric field whereas the unmetallized segments are not and in this manner, an electric field is developed on the emitter disk 80. The rim 86 of the emitter disk is also formed with a conductive strip of material to connect to the conductive sections in the outermost track of the pair of tracks 82 to further the electrical continuity of the metallized pattern.

Figure 8:
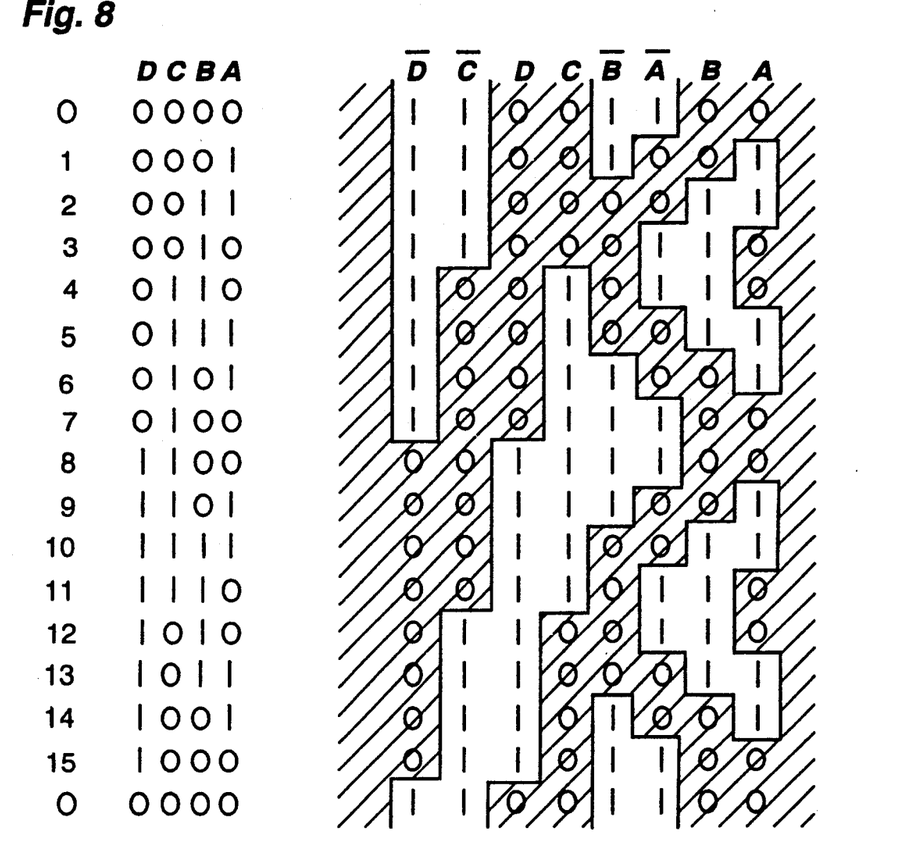
FIG. 8 is a schematic and diagrammatic representation of complementary tracks, laid out in a linear array, presenting a Gray code configuration.

FIG. 8 shows an exemplary arrangement of complementary tracks A, B, $\overline{A}$, $\overline{B}$, C, D, $\overline{C}$ and $\overline{D}$ laid out in a linear array and formed to present a Gray code. The tracks are shown to the right, with the metallized portions being shaded to represent "0's," and the nonmetallized portions representing "1's." The corresponding code value for each incremental advance along the tracks is shown to the left, and, as can be seen, the code value increases by one bit while advancing incrementally from the top to the bottom of the tracks. As can also be seen, all metallized portions of the tracks are electrically continuous and can be readily fabricated using etching and photolithographic techniques.

FIG. 3 is a top plan view of an emitter disk 90 illustrating the Gray code pattern formed thereon. Also shown beside the emitter disk 90 is a detector plate 92 including an annular conductive sheet 94 (coupling sheet) which, when the detector plate 92 is mounted in the transducer assembly of FIG. 1, will face the conductive sections on the emitter disk 90. The annular conductive sheet 94 is electrified by a square wave voltage signal from circuit logic 95 which receives power from the ring circuit board 48 (FIG. 1). Electrifying the conductive sheet 94 causes it to produce an electric field which results in the capacitive coupling of the annular conductive sheet 94 to the metallized pattern of the emitter disk to thus cause the conductive sections of the tracks to develop electric fields which are, in turn, directed back towards the detector plate 92.

Also disposed on the detector plate 92 is a radial array of sensors 96 and an arcuate array of sensors 98 which intersects the radial array. The radial array of sensors 96 are disposed adjacent to respective tracks of the emitter disk 90 so that as the emitter disk is rotated, the sensors detect the variation in electric fields produced by the track sections. The manner in which such detection is carried out will be discussed later. The arcuate array of sensors 98 provides a Vernier measurement of the sections of the outermost pair of tracks on the emitter disk to thereby increase the resolution achievable in determining angular displacement and position.

Figure 7:
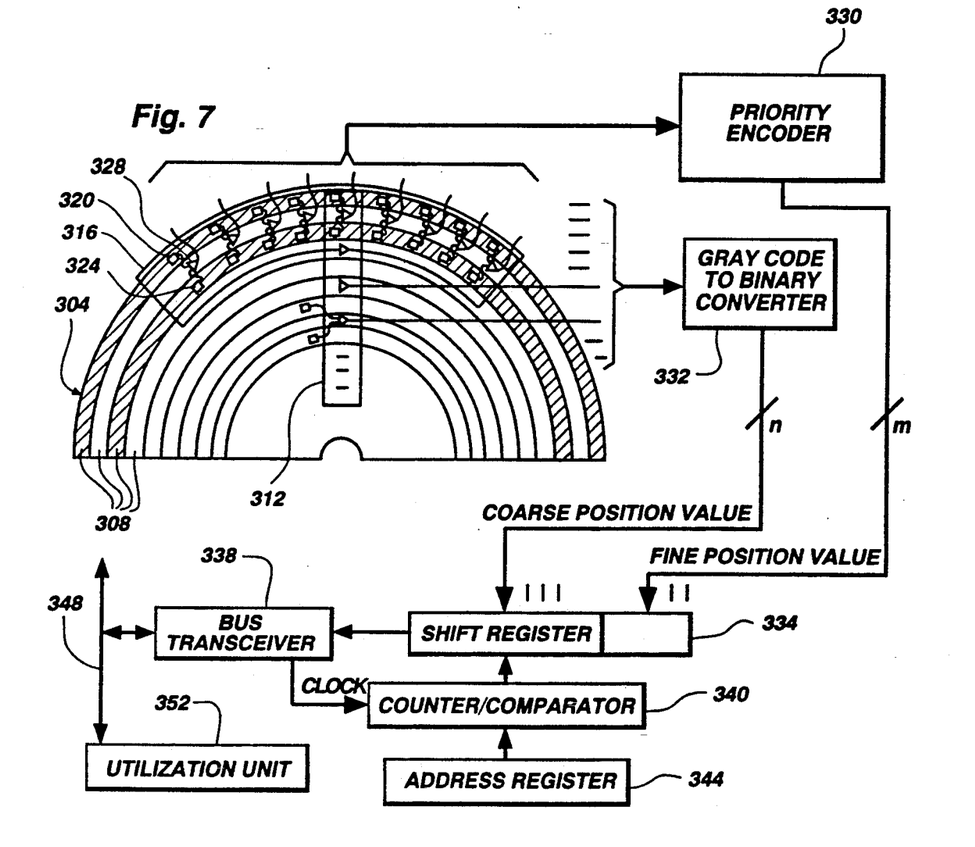
FIG. 7 is a top, fragmented, schematic view showing sensor elements positioned relative to concentric tracks of the emitter of FIG. 1, and associated logic circuitry.

Referring to FIG. 7, there is shown a schematic view of one-half of an emitter disk 304 showing a plurality of tracks 308. Shown disposed over the tracks in two arrays are a radial array of sensors 312 (Gray code array) and an arcuate or circumferential array of sensors 3 16 (Vernier array), as previously discussed. (These sensor arrays would be located on the detector plate or chip not shown in FIG. 7.) Each sensor in the arrays includes two electric field sensing elements, such as elements 320 and 324, each disposed over a respective track of a complementary pair for intercepting electric fields emanating from the tracks. Each sensor in the arrays also includes a regenerative differential amplifier, such as amplifier 328, coupled to the sensing elements (such as sensing elements 320 and 324). With this configuration, the sensing elements 320 and 324 will sense opposite conditions since the two tracks over which they are positioned are conjugate. That is, when one sensing element senses an electric field from an electrified section, the other sensing element will be sensing the absence of an electric field from a non-electrified section, and vice versa. Thus, opposite signals (for example a high and a low signal) will be supplied by the sensing elements 320 and 324 to the differential amplifier 328. The differential amplifier 328, in turn, produces an output signal representing the difference between values of the input signals. The use of conjugate tracks and differential amplifiers to sense the electric fields improves reliability in sensing transitions between electric fields and no electric fields over what would be achievable if single tracks were used.

Vernier measurement of linear displacement was described in U.S. Pat. No. 4,964,306, which is incorporated herein by reference, and the same techniques are utilized by the arcuate or Vernier array of sensors 316. Thus, for that portion of the two complementary tracks covered by the Vernier array, the number of sensors (which are uniformly spaced apart) is different from the number of segment transitions (or transitions from electric field to no electric field and vice versa) over that portion of the tracks. Advantageously, the number of sensors is one less than the number of segment transitions over the portion of the tracks covered by the Vernier array 316. With this configuration, upon even very small rotational displacement of the emitter disk 304, successive ones of the sensors in the Vernier array 316 will detect segment transitions, to thus provide readings or measurements of small incremental displacements. In effect, the Vernier array 316 provides fine readings of rotational displacement between successive increments or changes in Gray code value, as detected by the radial or Gray code array of sensors 312.

The sensors, including the sensing elements and differential amplifiers, are fabricated on the detector plate utilizing very large scale integration (VLSI) manufacturing techniques. The output of the sensors are supplied to interpretation logic which is also fabricated on the detector plate (identified as circuit logic 95 in FIG. 3) using VLSI techniques. Such interpretation logic includes a priority encoder 330 which receives the output from the sensors in the Vernier array of sensors 316 and converts the vernier scale readout, represented by the sensor output, into a binary coded value. This can be done by table look-up or conventional combinatorial logic. This binary value of, for example, m bits is supplied by the priority encoder 330 to a section of a shift register 334 representing the least significant bits of the information stored in the shift register.

The outputs from the sensors in the Gray code sensor array 312 are supplied to a Gray code to binary converter 332 which converts the sensor outputs to a binary representation of the value of the Gray code encountered by the Gray code sensor array. This binary information, for example n bits, is supplied to the shift register 334 and stored in positions representing more significant bit positions than the information supplied by the priority encoder 330. The Gray code to binary conversion is likewise carried out in a conventional fashion by the converter 332, for example, by table look-up or combinatorial logic.

In this manner, more coarse positions or displacement of the emitter disk 304 are determined by detection of Gray code changes with movement of the disk and thus the shaft on which the disk is mounted, whereas the Vernier array of sensors 316 provides for more fine position or displacement determination of the emitter disk (between each increment in value of the Gray code). Thus, the Gray code provides for the coarse position measurements of emitter disk and the Vernier array provides for the fine positioned measurements and thus the desired high resolution.

The information stored in the shift register 334, representing the angular position of the shaft on which the emitter disk 304 is mounted may be selectively shifted from the register to a bus transceiver 338 in response to a shift signal received from a counter/comparator circuit 340. The counter/comparator circuit 340 counts clock pulses supplied by the bus transceiver 338 and when the count reaches a value corresponding to an address stored in an address register 344, the shift signal is supplied to the shift register 334. The address stored in the address register 344 identifies the particular angular displacement transducer of which the circuitry of FIG. 7 is a part. Use of the address register 344 in this manner allows for multiplexing the outputs of many angular displacement transducers onto a single output bus such as bus 348 shown in FIG. 7. In effect, the clock pulses supplied by the bus transceiver 338 to the counter/comparator 340 would also be supplied in parallel to other counter/comparators of other transducers, and when the particular addresses identifying the respective transducers were reached by the corresponding counter/comparators, the angular position measurement residing in the corresponding shift register would be supplied to the bus 348 for ultimate supply to a utilization unit 352. In this manner, angular position measurements are multiplexed onto the bus 348 and supplied to the utilization unit 352 which may display the information, process it for use in changing or controlling the object or objects whose angular positions are being measured, etc. The bus 348 and utilization unit 352 would be in common with all of the angular displacement transducers while each transducer includes its own bus transceiver, shift register, counter/comparator, address register, etc. All of such logic and circuitry may be fabricated on the detector plate 92 at the region 95 shown in FIG. 3, using VLSI techniques.

Figure 9:
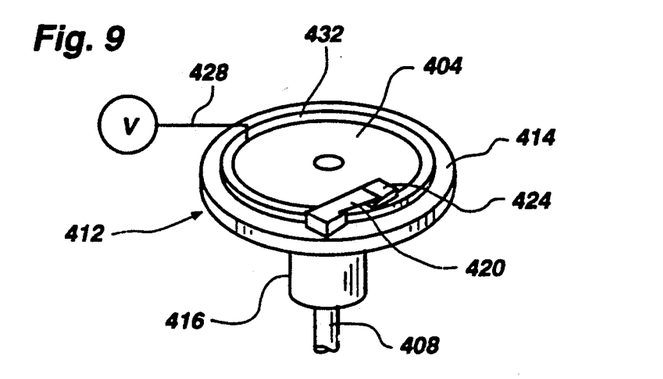
FIG. 9 is a perspective, fragmented view of an emitter disk and stylus mounted detector structure made in accordance with the present invention.

FIG. 9 shows a perspective, partially fragmented view of an emitter disk 404 on which the concentric, segmented tracks would be located, mounted on a shaft 408 whose angular position was to be determined, in turn, rotationally mounted in a support structure 412 which remains fixed while allowing the shaft and emitter disk to rotate. The support structure 412 includes a disk 414 and a sleeve 416 both of which circumscribe the shaft 408. Mounted at one end at the edge of the disk 14 is an arm 420 made of resilient material such as metal. Mounted on the free end of the arm 420 is a sensor array 424 held in light rubbing contact with the disk 404 or just above the disk 404 to provide rotational sensing of the emitter disk 404 as earlier described. The metallized segments on the emitter disk 404 could illustratively be energized by a voltage supply wiper element maintained in light rubbing contact with a conductive ring 432 formed on the emitter disk 404. The conductive ring 432 is electrically connected to the metallized segments of the tracks as earlier described.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. Rotary displacement measuring apparatus comprising a shaft whose rotary displacement is to be measured, said shaft mounted to rotate about its long axis, field generating means for developing electric field input signals, emitter means coupled to the shaft to rotate as the shaft is rotated, and responsive to the electric field input signals for developing predetermined patterns of electric fields emanating from the emitter means, said patterns varying circumferentially on the emitter means, and detector means disposed in close proximity to the emitter means adjacent the path in which the emitter means rotates to directly intercept the electric fields and detect variation in the electric field patterns, exclusively of other electrical parameters, at selected radial locations as the emitter means is rotated for producing output signals representing variations in the electric field patterns at the radial locations and thus rotary displacement of the shaft, said field generating means being attached to said detector means.

2. Apparatus as in claim 1 wherein said emitter means comprises a generally planar emitter plate mounted on the shaft to rotate in the plane defined by the emitter plate and to direct the patterns of electric fields normally from an active side of the plate, and wherein said detector means comprises a generally planar detector plate disposed in a fixed position, generally parallel with the emitter plate on the active side thereof to thereby detect variation in the electric field patterns as the emitter plate is rotated.

3. Apparatus as in claim 2 wherein said emitter plate comprises a disk mounted generally to its center to the shaft, and emitter element section s formed in predetermined patterns on the active side of the disk to develop the electric field patterns in response top the electric field input signals, said field generating means including means for supplying electric field input signals to the emitter element sections.

4. Apparatus as in claim 3 wherein said detector plate is disposed about said shaft, wherein said disk is moveable axially on the shaft, said apparatus further including bias means disposed about the shaft to rotate as the shaft is rotated, said bias means being coupled to the disk to force the disk into sliding contact with the detector plate.

5. Apparatus as in claim 4 further comprising a wear-resistant film disposed over the detector plate.

6. Apparatus as in claim 3 wherein said detector plate is disposed about said shaft, wherein said disk is moveable axially on the shaft and includes a raised central section for contacting the detector plate when moved theretoward, said apparatus further including bias means disposed about the shaft to rotate as the shaft is rotated, said bias means being coupled to the disk to force the disk toward the detector plate so that the raised central section makes sliding contact with the detector plate to maintain the remainder of the disk out of contact from the detector plate.

7. Apparatus as in claim 4 or 6 wherein said bias means comprises a disk made of a material which is resilient in a direction normal to the disk and including a plurality of concentrically formed arcuate slots, said material being formed frustoconically with the perimeter of the disk coupled to the detector plate at the perimeter thereof, and the center of the disk coupled to the shaft.

8. Apparatus as in claim 7 wherein said slots are formed as concentric pairs, with each slot of a pair being co-circumferential with the other slot of the pair, such that adjacent ends of the slots of each pair are circumferentially offset from adjacent ends of a next radially adjacent pair slots.

9. Apparatus as in claim 3 wherein said electric field signal supplying means comprises a conductive layer of material disposed on the detector plate on the side facing the active side of the disk for developing an electric field to capacitively couple the layer and the emitter element sections when a voltage signal is supplied to the layer, said emitter element sections thereby developing electric fields, and voltage supply means for supplying a voltage signal to the conductive layer of material.

10. Apparatus as in claim 9 wherein said emitter element sections are electrically coupled together.

11. Apparatus as in claim 10 wherein said emitter element sections are formed into a plurality of concentrically disposed, selectively segmented tracks, positioned to present successively changing patterns circumferentially about the emitter plate.

12. Apparatus as in claim 11 wherein said detector means comprises a first plurality of electric field sensors disposed radially on the detector plate for detecting variations in the electric field patterns as the emitter plate rotates.

13. Apparatus as in claim 12 wherein said segmented tracks are formed to present a digital Gray code such that upon rotation of the emitter plate in increments of a predetermined amount, the sensors detect at least a one-bit change in the code.

14. Apparatus as in claim 13 wherein the track segments presenting the Gray code are formed into a plurality of pairs of complementary tracks, each track of a pair being spaced radially at least one track apart, and wherein said sensors comprise a plurality of pairs of sensors, each pair being positioned adjacent a respective pair of complementary tracks at substantially the same circumferential locations to detect electric fields which may emanate from the tracks, and a plurality of regenerative differential amplifier means, each coupled to a respective pair of sensors for producing an output signal representing the difference between electric fields detected by the pair of sensors.

15. Apparatus as in claim 12 wherein one of said tracks includes a plurality of uniformly spaced-apart segments, and wherein said detector means further comprises a second plurality of electric field sensors disposed in an arc on the detector plate adjacent said one track for detecting transitions between the segments of the one track as the emitter plate rotates, said sensors of the second plurality being spaced apart uniformly such that for a certain range of rotation of the emitter plate, each sensor at some point over the range will be the only sensor positioned directly adjacent a segment transition.

16. Apparatus as in claim 15 wherein the number of sensors in the second plurality differs by one from the number of segment transitions in the one track over a distance equal to the length of the arc.

17. Apparatus as in claim 16 wherein the first plurality of sensors intersects the second plurality of sensors such that each plurality shares one sensor in common.

18. Apparatus as in claim 15 wherein said one track is the outermost track on the emitter plate.

19. A rotary displacement transducer comprising an axle whose rotary displacement is to be determined, said axle being mounted to rotate about its long axis, emitter means mounted on the axle to define a plurality of concentric tracks circumscribing the axle to rotate as the axle rotates, each of said tracks being segmented to define a plurality of spaced-apart, conductive sections for producing electric fields when energized, wherein the sections of said tracks are formed to define a Gray code whose value changes incrementally relative to rotation of the tracks by a certain amount past a fixed radial locus, means for energizing said conductive sections, detector means disposed adjacent to the tracks of the emitter means and including a plurality of sensors, each positioned adjacent a respective track to detect the electric fields of said respective track as the axle and tracks are rotated, and produce signals representing such detection, wherein said sensors are positioned in an array coincident with said radial locus to produce signals representing the Gray code values of the tracks at the radial locus, and wherein said detector means further includes a second plurality of sensors disposed in an arc adjacent a selected track and positioned relative to sections of a selected track to produce signals representing Vernier measurements of the rotary displacement of the selected track as it rotates by said certain amount relative to the second plurality of the sensors, and means for processing the sensor signals to produce an output signal indicating the rotary displacement of the tracks and thus of the axle.

20. A transducer as in claim 19 wherein said processing means further includes means for converting the signals representing the Gray code values into first binary data, means for converting the signals representing Vernier measurements into second binary data, means for combining the first and second binary data into a binary word representing rotary displacement of the axle.

21. A transducer as in claim 20 wherein said processing means further includes means for selectively supplying the binary word to a utilization unit.

22. A transducer as in claim 21 wherein said supplying means includes a data bus coupled to the utilization unit and coupleable to other transducers, a shift register for temporarily storing the binary word, an address register for storing an address number identifying the transducer, counter/comparator means coupled to the address register for receiving and counting clock pulses and for signalling the shift register to shift its contents to the data bus when the clock pulse count equals the value of the address number, and means for supplying clock pulses to the counter/comparator means.

23. A transducer as in claim 19 wherein tracks are formed as a plurality of pairs of complementary tracks in which the sections of one track of a pair are conjugate, at any given circumferential position, to the sections of the other track of the pair, and wherein each sensor comprises a pair of detector elements disposed adjacent respective tracks of a pair for detecting the electric fields produced by the sections of the respective tracks, and a regenerative differential amplifier coupled to the pair of detector elements for producing a sensor signal representing the difference between electric fields detected by the detector elements.

24. A transducer as in claim 23 wherein the complementary tracks of each pair are positioned radially at least one track apart.

25. A transducer as in claim 24 wherein the selected pair of complementary tracks is the radially outermost pair on the emitter means.

26. A transducer as in claim 19 further including a fixed support, and wherein said detector means comprises a resilient arm, one end of which is mounted on the fixed support, said sensors being mounted on the other end of said arm to be maintained in positions adjacent respective tracks.

27. A rotary displacement measuring system comprising a shaft whose rotary displacement is to be measured, said shaft being rotatable about its long axis, an emitter plate mounted on the shaft to rotate therewith in a plane corresponding to the plane of the plate, said plate including a pattern of sections for emitting electric fields normally of one face of the plate when energized, detector means disposed adjacent said face of the plate in fixed position relative thereto, for detecting changes only in the electric field pattern as the emitter plate rotates, said detector means including means attached thereto for energizing the sections of the emitter plate to produce the electric fields.

28. A system as in claim 27 wherein said pattern of sections comprises interconnected conductive sections disposed on said one face of the emitter plate, and wherein said detector means and energizing means further include a detector plate disposed adjacent to and generally parallel with the one face of the emitter plate, a conductive sheet disposed on the face of the detector plate directly adjacent said one face of the emitter plate for capacitively coupling with said pattern of sections in response to a voltage signal, and means for supplying a voltage signal to said conductive sheet.

29. A system as in claim 28 further comprising a dielectric film disposed over said conductive sheet, and means for biasing the emitter plate into sliding contact with the dielectric film.

30. A system as in claim 28 wherein said emitter plate comprises a disk mounted at its center point on the shaft, said disk including an annular rise upstanding from said one face about the shaft, said system further including means for biasing the emitter plate toward the detector plate so that the rise makes sliding contact with the detector plate to maintain the remainder of the emitter plate out of contact with the detector plate.

31. A system as in claim 28 wherein said pattern of sections comprises a plurality of concentric tracks, each including a plurality of spaced-apart conductive sections interconnected with the sections of the other tracks, and wherein said detector means further includes a first plurality of sensors disposed on the detector plate opposite a respective track for detecting transitions between conductive sections and the intervals between such sections, to thus detect displacement of the emitter plate and thus of the shaft.

32. A system as in claim 31 wherein said detector means further includes a second plurality of sensors disposed in an arc opposite a selected track and positioned to develop a Vernier measurement of movement of said selected track.

33. A system as in claim 32 wherein said first plurality of sensors are disposed in a radial array on the detector plate to intersect the second plurality of sensors.

* * * * *